United States Patent [19]
Tseng et al.

[11] Patent Number: 5,896,568
[45] Date of Patent: Apr. 20, 1999

[54] WIRELESS ARCHITECTURE HAVING REDISTRIBUTED ACCESS FUNCTIONS

[75] Inventors: Stone Tseng; Kalyan Basu; Yixin Zhu, all of Plano, Tex.; Khaled Elsayed, Cairo, Egypt

[73] Assignee: Northern Telecom Limited, Quebec, Canada

[21] Appl. No.: 08/708,971

[22] Filed: Sep. 6, 1996

[51] Int. Cl.$^6$ .................. H04B 7/212; H04B 7/04
[52] U.S. Cl. .................. 455/422; 455/446; 455/38.3; 370/337
[58] Field of Search .................. 455/422, 435, 455/436, 462, 463, 464, 465, 423, 427, 38.3, 69, 445, 446; 370/335, 336, 337, 339

[56] References Cited

U.S. PATENT DOCUMENTS

| | | | |
|---|---|---|---|
| 4,827,499 | 5/1989 | Warty et al. | 455/560 |
| 4,974,256 | 11/1990 | Cyr et al. | 379/113 |
| 5,177,780 | 1/1993 | Kasper et al. | 455/413 |
| 5,195,090 | 3/1993 | Bolliger et al. | 370/314 |
| 5,339,184 | 8/1994 | Tang | 359/124 |
| 5,434,851 | 7/1995 | Hesse | 370/360 |
| 5,434,852 | 7/1995 | La Porta et al. | 370/385 |
| 5,446,756 | 8/1995 | Mallinckrodt | 455/423 |
| 5,490,172 | 2/1996 | Komara | 375/296 |
| 5,633,873 | 5/1997 | Kay et al. | 370/336 |
| 5,671,219 | 9/1997 | Jensen et al. | 455/38.3 |
| 5,673,259 | 9/1997 | Quick, Jr. | 455/38.3 |

FOREIGN PATENT DOCUMENTS

| | | |
|---|---|---|
| 0 631 450 A1 | 12/1984 | European Pat. Off. . |
| 0 440 081 A2 | 8/1991 | European Pat. Off. . |
| WO 93/11625 | 6/1993 | WIPO . |
| WO 94/28690 | 12/1994 | WIPO . |
| WO 96/22666 | 7/1996 | WIPO . |
| WO 96/29834 | 9/1996 | WIPO . |

OTHER PUBLICATIONS

Makoto Shibutani et al., "Optical Fiber Feeder for Microcellular Mobile Communication Systems (H-015)", IEEE Journal on Selected Areas in Communications, vol. 11, No. 7, pp. 1118-1126, Sep. 1993.

*Primary Examiner*—Willis R. Wolfe
*Attorney, Agent, or Firm*—Finnegan, Henderson, Farabow, Garrett & Dunner, L.L.P.

[57] ABSTRACT

A wireless access architecture, having redistributed wireless access functions, comprises a plurality of cell sites connected to a main switching point. The cell sites communicate with cellular users within their respective cell site areas and comprise a communication segment for exchanging communication signals with the cellular users. The main switching point controls the communication with the cellular users and the communication segment and includes a processing segment for processing the communication signals from the cell sites. The processing segment includes a segment for modulating and demodulating the communication signals, and a segment for bit stream processing the communication signals.

19 Claims, 7 Drawing Sheets

TRADITIONAL CELL
BOUNDARY
(SECTORIZED
ANTENNA)

FIG. 5B

REDEFINED CELL
BOUNDARY(SAME
ANTENNAS,DIFFERENT
LOGICAL STRUCTURE)

FIG. 5C

WIRELESS ARCHITECTURE HAVING REDISTRIBUTED ACCESS FUNCTIONS

BACKGROUND OF THE INVENTION

The present invention is directed to a wireless access architecture that redistributes a portion of the access function components traditionally located at the cell sites.

Wireless access technology is becoming the major driver for new Personal Communication Services (PCS), including new services and low cost fixed access services for developing telecommunication networks. The most expensive component of today's wireless network relates to network access, where almost 80% of the investment is made. Very complex and operation extensive equipment is located at the cell site. The cell site is the area having the receiving and transmitting antennas and the base station equipment. Cell site operations typically require expensive operation and maintenance activities.

Proper handling of mass calling traffic situations for PCS services, such as those typically occurring during or after a concert or sporting event requires increased cell site equipment. This increased equipment is under-utilized at times other than mass calling traffic situations. Thus, there is a need for new architectures for wireless access systems that can reduce the overall cost of network ownership while being capable of handling mass traffic situations by taking advantage of recent advancements in technology.

Traditionally, the post-detection functions of digital radio, such as channel coding and speech coding, used Digital Signal Processing (DSP) technology. The continuous advancement of DSP technology and the integration of parallel computing make it possible to develop a DSP with very high computing power. Recently, DSP technology has been used in detection, equalization, demodulation, frequency synthesis and channel filtering. Other technological advancements include the development of wideband analog-to-digital (A/D) converters with a large dynamic range. The development of these two technologies have fostered a new technology called "software radio."

SUMMARY OF THE INVENTION

The present invention reduces the cost of network ownership, increases the capability of handling mass calling traffic, and reduces the quantity of cell site equipment.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve these objects, and in accordance with the purpose of the invention as embodied and broadly described herein, the present invention takes advantage of the advancements of DSP and A/D conversion technologies along with asynchronous transfer mode (ATM) and other broadband technology to simplify base station functions at the cell sites and to provide uniform service to cell site users by redistributing the access functions of the wireless network.

The present invention includes a wireless access architecture comprising a plurality of cell sites connected to main switching point means. The cell sites service cellular users within their respective cell site areas and comprise communication means for exchanging communication signals with the cellular users. The main switching point means controls the communication with the cellular users and the communication means and includes means for processing the communication signals from the cell sites. The processing means comprises means for modulating and demodulating the communication signals and means for bit stream processing the communication signals.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

Figure 1A:
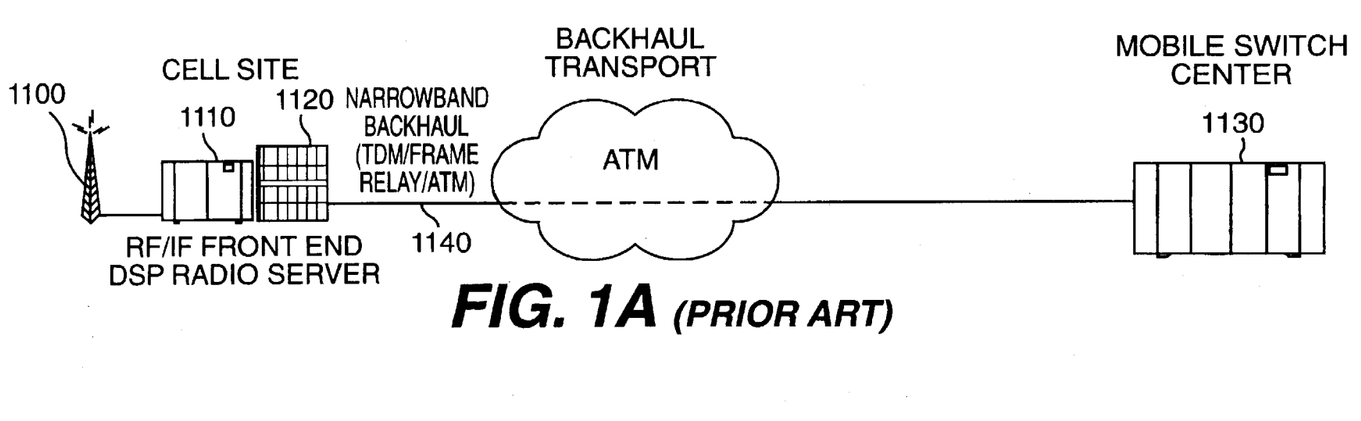
FIG. 1A shows a traditional model of a wireless access system.

FIG. 1A shows a traditional model of a wireless access system in which a cell site contains antenna 1100, Radio Frequency (RF) and Interface (IF) front end equipment 1110, and DSP Radio Server 1120. The cell site equipment communicates with Mobile Switching Center (MSC) 1130 via backhaul transport 1140. Backhaul transport 1140 links communications between the cell site and the trunk resource, or switching fabric, of the communication system. The traditional backhaul transport 1140 is T1/E1 used to carry Time Division Multiplex (TDM), Frame Relay traffic, or narrowband ATM, including control and voice communications.

Figure 1B:
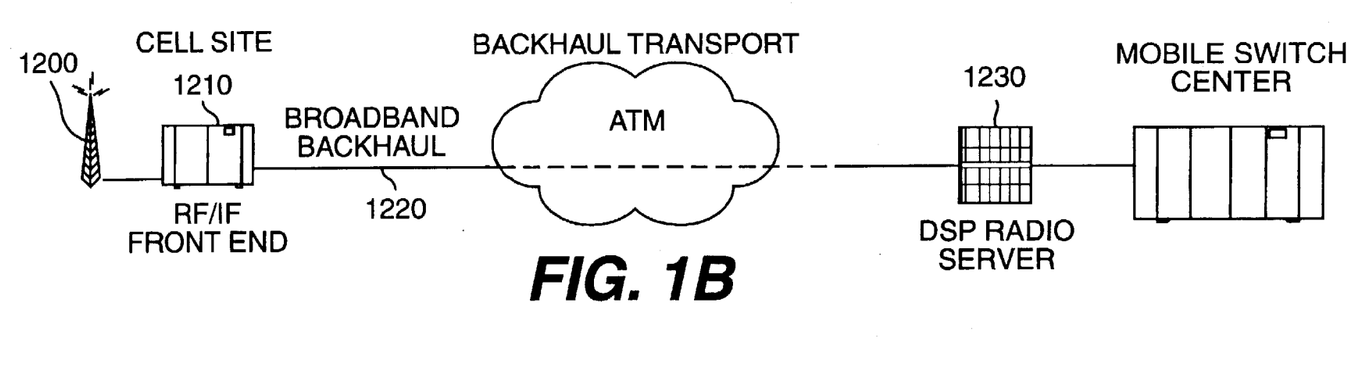
FIG. 1B shows a model of a wireless access system having redistributed access functions, according to a first embodiment of the present invention.

FIG. 1B shows a model of a wireless access system having redistributed access functions according to a first embodiment of the present invention. In the first embodiment, the cell site contains less equipment than the cell site in the traditional model. Antenna 1200 and RF/IF front end equipment 1210 remain located at the cell site as in the traditional model. The remaining cell site equipment of the traditional model, however, is located at a remote site.

The cell site equipment communicates over broadband backhaul transport 1220 with a centralized DSP Radio Server 1230. Broadband backhaul transport 1220 carries high-speed wideband digitized radio signals from the cell site equipment over an ATM network.

Figure 1C:
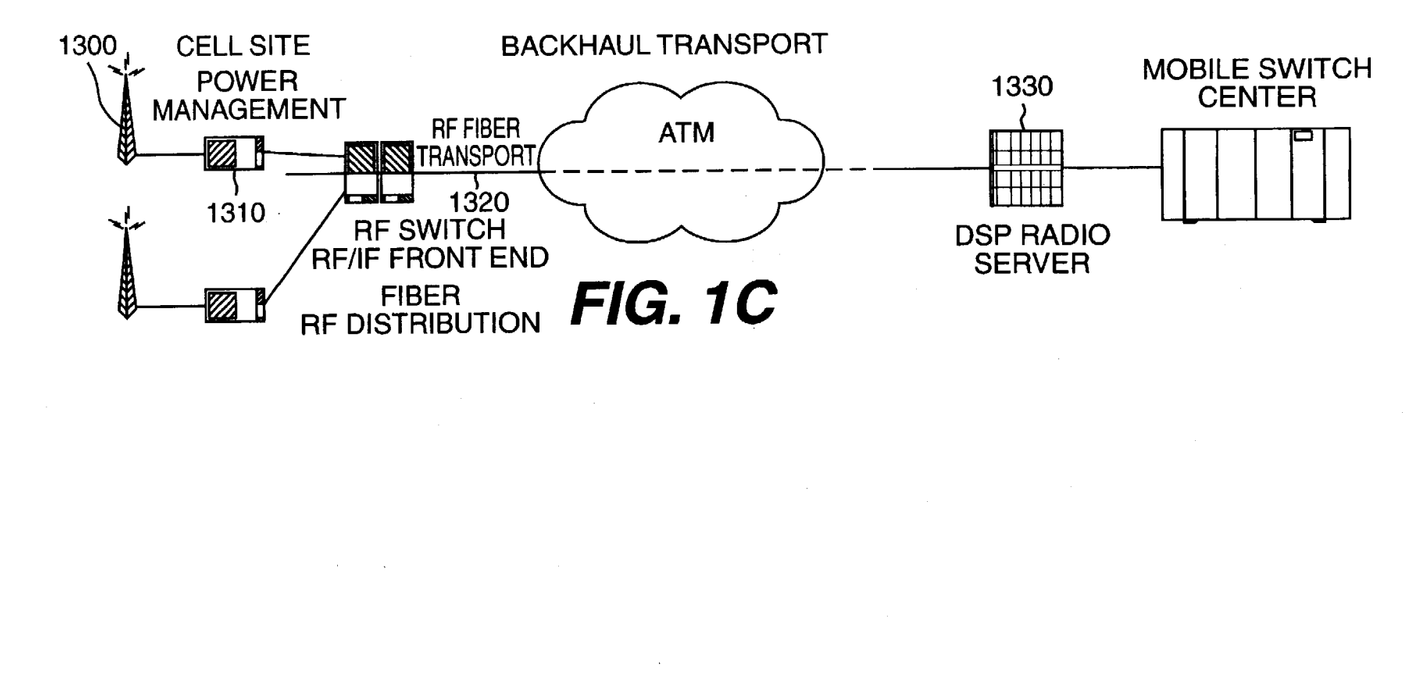
FIG. 1C shows a model of a wireless access system having redistributed access functions, according to a second embodiment of the present invention.

FIG. 1C shows a model of a wireless access system having redistributed access functions according to a second embodiment of the present invention. In the second embodiment, the cell site contains even less equipment than in the first embodiment: only antenna 1300 and power management component 1310. The cell site equipment transmits the RF signal over RF Fiber Transport backhaul 1320 to DSP Radio Server 1330. RF Fiber Transport backhaul 1320 distributes the RF signal through analog fiber and communicates the signal to DSP Radio Server 1330 over an ATM network.

Figure 2A:
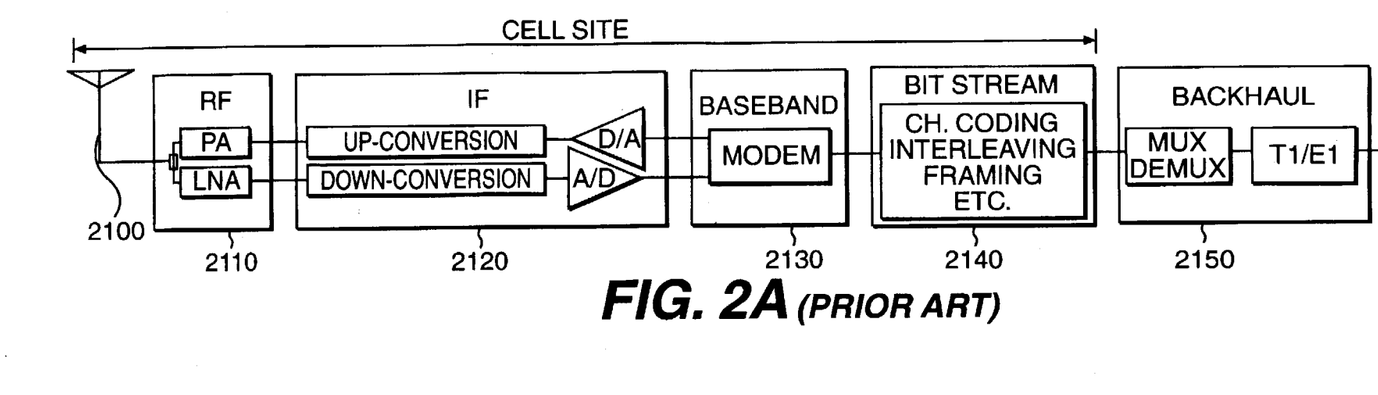
FIG. 2A shows segments representing the wireless access system functions according to the traditional model of FIG. 1A.
Figure 2B:
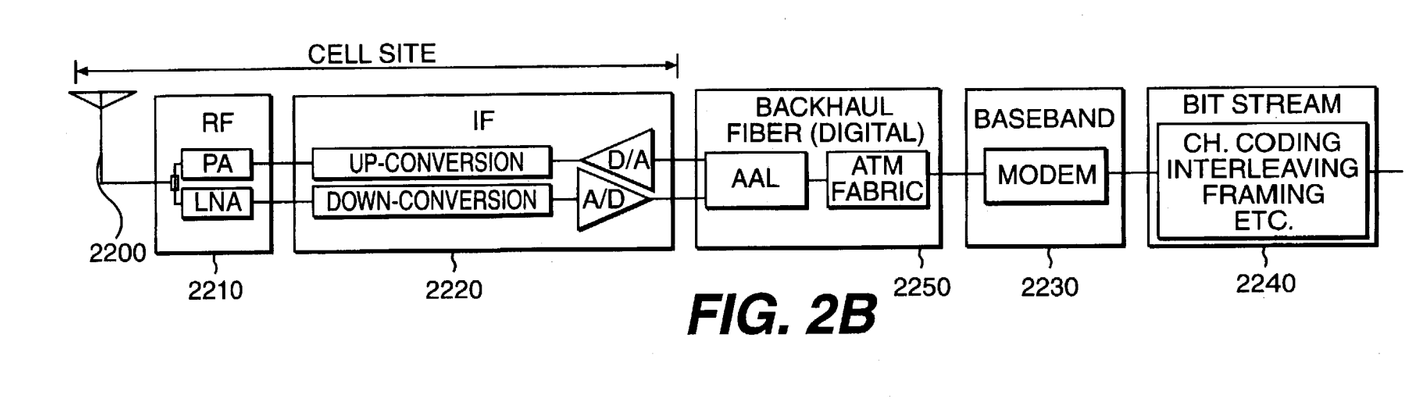
FIG. 2B shows segments representing the wireless access system functions according to the first embodiment depicted in FIG. 1B.
Figure 2C:
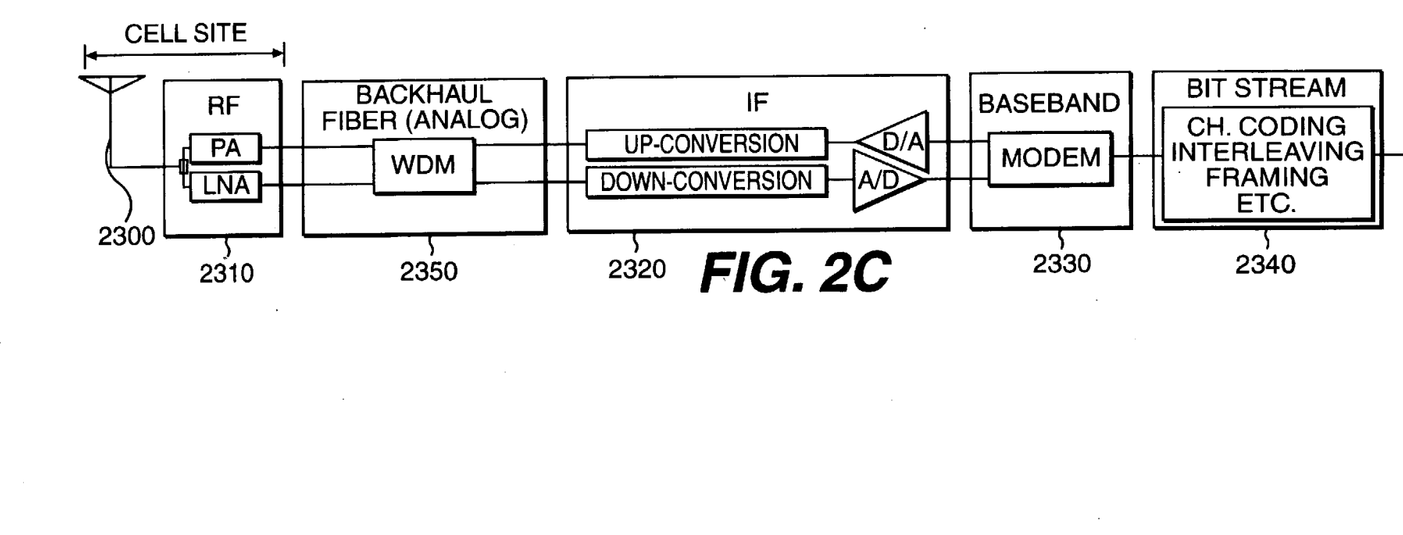
FIG. 2C shows segments representing the wireless access system functions according to the second embodiment depicted in FIG. 1C.

Communication between the cellular users and the MSC requires six separate functions which are conceptually shown as segments in FIGS. 2A–2C. Even though the cell site equipment is logically partitioned into six segments in FIGS. 2A–2C, the cell site equipment could be logically partitioned into different numbers of segments without affecting the operation of the present invention. As FIG. 2A shows, the cell site of the traditional model contains five of the segments.

Antenna segment 2100 includes both transmit and receive antennas for communicating directly with the cellular users. RF segment 2110 includes power amplifier (PA), low noise amplifier (LNA), transmit-combining, and receiving multi-coupler components. IF segment 2120 includes components for performing up-conversion, down-conversion, A/D conversion, and digital-to-analog (D/A) conversion. Baseband segment 2130 performs modulation, demodulation, equalization, and detection. Bit stream segment 2140, the final segment located at the cell site, performs signal processing, such as channel coding, interleaving, framing, etc. . . .

In the traditional model, backhaul segment 2150 connects the cell site to a main switching point. According to the traditional model, backhaul segment 2150 comprises a multiplexer/demultiplexer (mux/demux) and T1/E1 for carrying TDM, Frame Relay traffic, or narrowband ATM.

FIG. 2B shows the segments in the first embodiment of the present invention shown in FIG. 1B. In the first embodiment, the cell site contains antenna segment 2200, RF segment 2210, and IF segment 2220. These segments contain similar components and perform similar functions as described above with respect to the traditional model.

Unlike the traditional model, however, the cell site in the first embodiment does not contain baseband segment 2230 or bit stream segment 2240. Instead, these segments are preferably remotely located at an MSC. Alternatively, these segments may be located at a base station controller, a centralized DSP server, or any main switching point.

Backhaul segment 2250 in the first embodiment comprises a digital fiber broadband backhaul. The digital fiber broadband backhaul may be any high-speed backhaul, but ATM is preferred. In FIG. 2B, backhaul segment 2250 includes an ATM adaption layer protocol (AAL) component and the ATM fabric.

FIG. 2C shows the segments in the second embodiment of the present invention shown in FIG. 1C. In the second embodiment, the cell site contains only antenna segment 2300 and RF segment 2310. IF 2320, baseband 2330, and bit stream 2340 segments are remotely located at the MSC. Alternatively, these segments may be located at a base station controller, a centralized DSP server, or any main switching point.

Backhaul 2350 in the second embodiment is an analog fiber backhaul. In FIG. 2C, the analog fiber backhaul carries wavelength division multiplexed (WDM) data between the cell site and the MSC.

The wireless access architecture redistributions according to this invention have distinct advantages over prior art systems. One such advantage is that the cell sites usable with this invention handle very high localized traffic situations because the localized traffic can be distributed to a number of DSP servers, for example. Each of the DSP servers would contain the redistributed cell site equipment shown in FIGS. 2B and 2C. A second advantage is that the cell sites usable with this invention require less extensive maintenance because minimal equipment remains at the cell site and this remaining equipment is less complex than the cell site equipment of prior art systems. Another advantage is that the cost of network ownership is reduced due to the minimal amount of equipment retained at the cell sites and the less extensive maintenance required.

When the present invention is implemented in single-star network, double-star network, or macrodiversity topologies, all of which are discussed below, the benefits promoted by the present invention become apparent.

Figure 3:
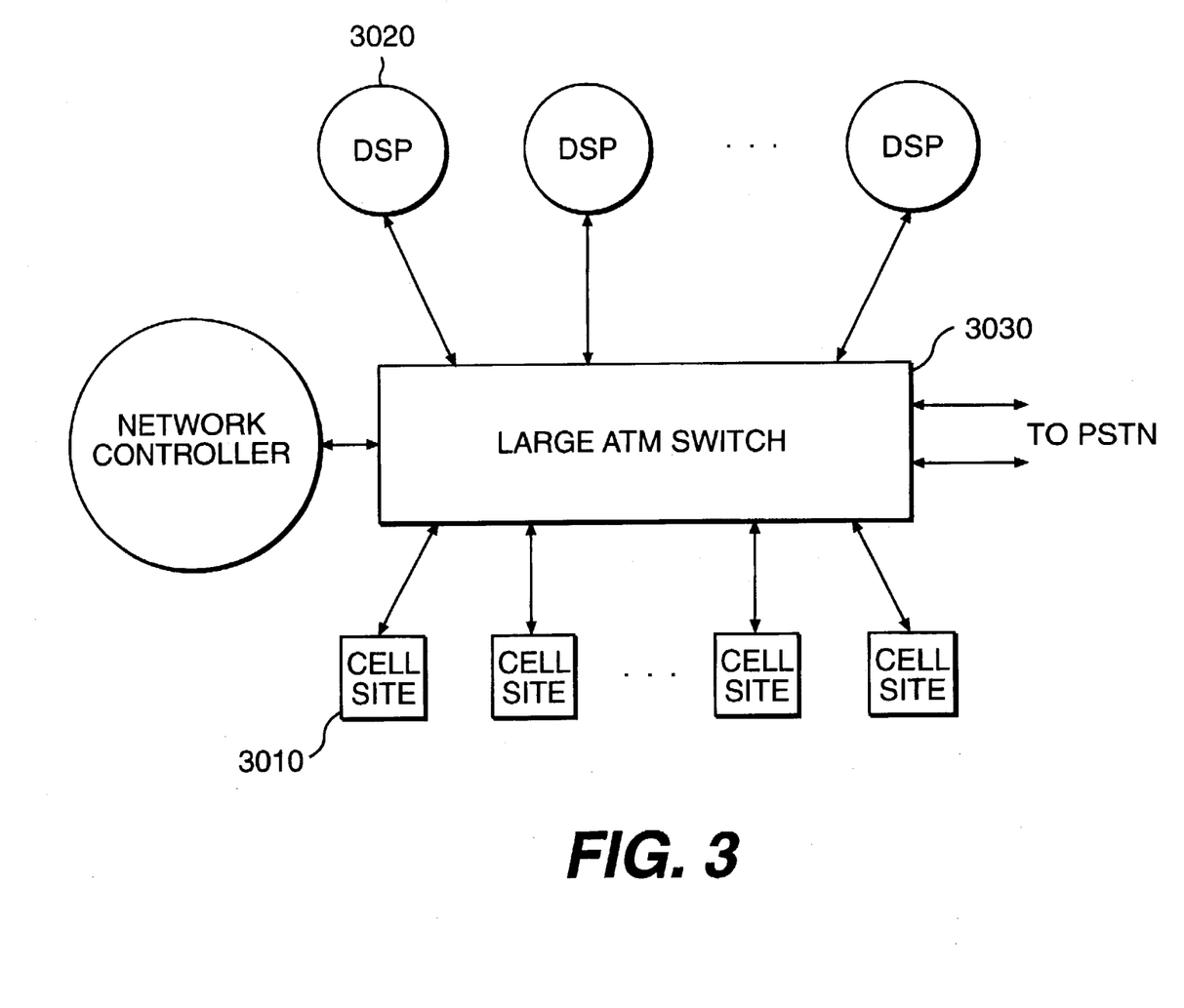
FIG. 3 shows a single-star network topology implementing the present invention.

FIG. 3 shows an embodiment of this invention in a single-star network topology. In such a topology, cell sites 3010 connect to DSP servers 3020 via a central ATM switch 3030. ATM switch 3030 is preferably a Nortel ATM-10 Concorde switch, which is a large ATM non-blocking switch with a nominal capacity of 10 Gbps. A backhaul transport facility connects cell sites 3010 to ATM switch 3030.

DSP servers 3020 perform some of the wireless access functions, including channel filtering, baseband processing, and bit stream processing. They act as a common resource pool to provide scalable DSP processing power shared by cell sites 3010. By performing some of the wireless access functions in DSP servers 3020, the single-star network may handle wide ranges of communication traffic efficiently because overloaded cell sites distribute most processing of their communication traffic to DSP servers 3020, instead of handling all of the processing themselves, as in prior art systems.

Figure 4:
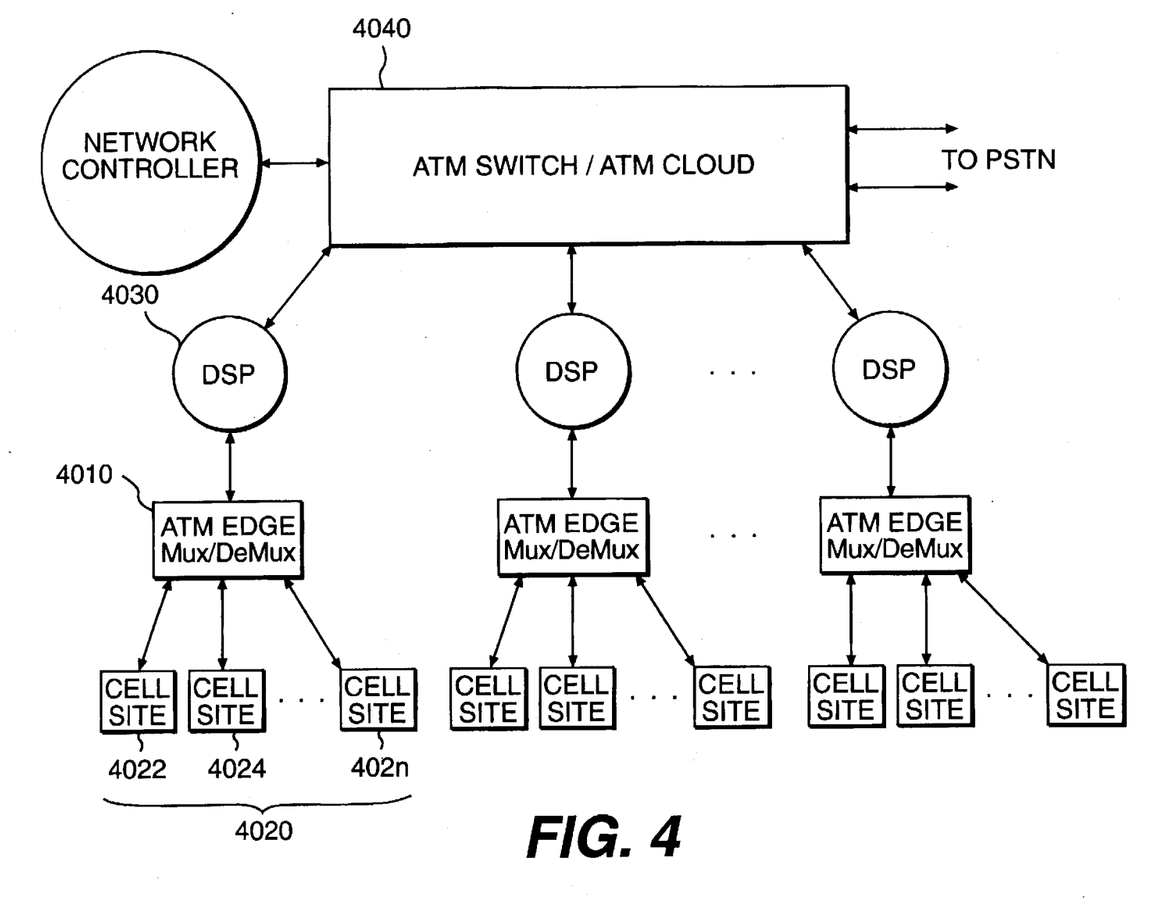
FIG. 4 shows a double-star network topology implementing the present invention.

FIG. 4 shows an embodiment of this invention in a double-star network topology. In the double-star ATM network configuration, a hierarchy of ATM switches interconnect the network components. ATM Edge Switch 4010 statically connects cell sites 4020 to a specific DSP server 4030. DSP server 4030 services a group of cell sites (e.g., 4022, 4024, . . . , 402n).

Another ATM switch 4040 interconnects DSP servers 4030 and transports the mobile user encoded voice or other traffic to other network components and to the rest of world (the PSTN, Internet, etc.). In contrast to the single-star network topology, DSP servers 4030 in the double-star network topology provide a common computing resource to a dedicated group of cell sites 4020.

The presence of DSP servers 4030 makes it possible to optimize the backhaul bandwidth in the double-star network topology because only a portion of the signal from the cell site needs to be transmitted to ATM switch 4040. DSP servers 4030 receive the entire cell site signal, but after processing transmit only a portion of the signal to ATM switch 4040. Therefore, in addition to the benefits obtained in the single-star network topology, the double-star network topology, when implementing the present invention, offers a network alternative with an optimum backhaul bandwidth.

Figure 5A:
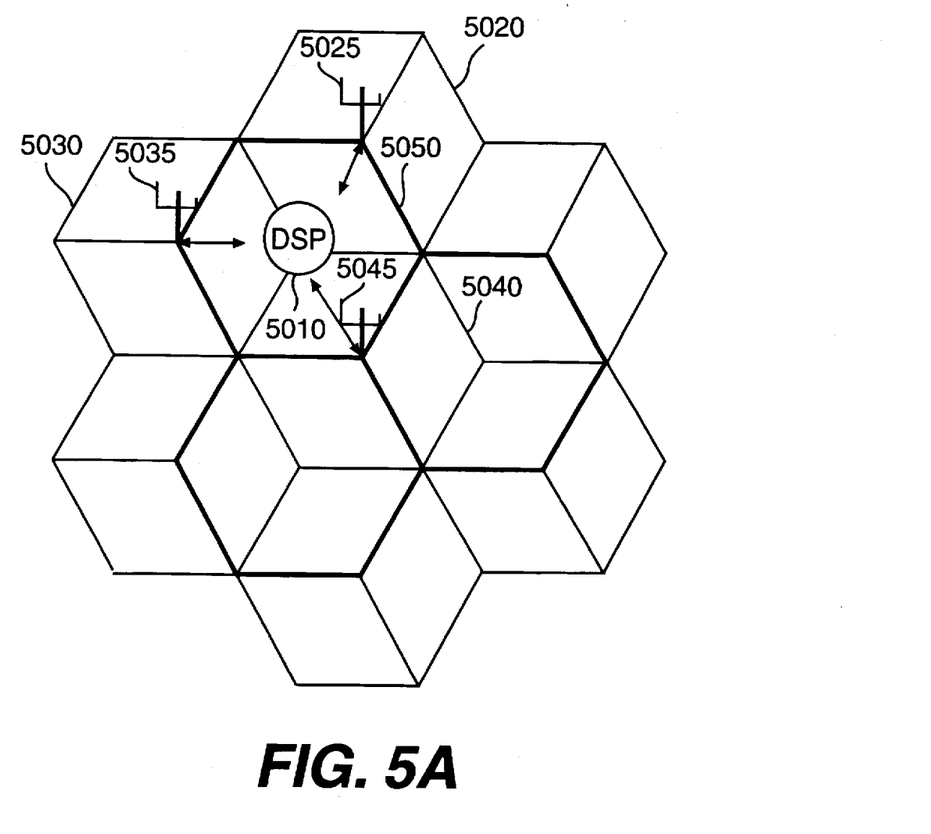
FIG. 5A shows cell sites, according to the present invention, arranged in a macrodiversity topology.
Figure 5B:
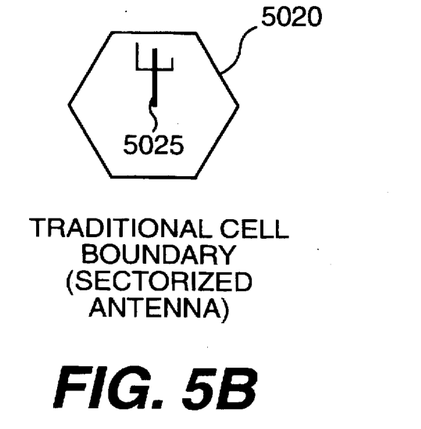
FIG. 5B shows a traditional cell site boundary.
Figure 5C:
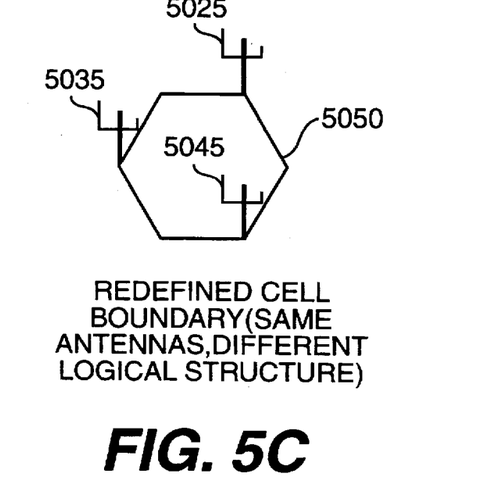
FIG. 5C shows a redefined cell site boundary.

FIG. 5A shows cell sites arranged, according to the present invention, in a macrodiversity topology. In the macrodiversity topology, centralized DSP server 5010 services a group of cell sites (5020, 5030, 5040) and performs various wireless access functions. The traditional cell site boundary 5020, shown in FIGS. 5A and 5B, includes single antenna 5025 for communication. On the other hand, redefined cell boundary 5050, shown in FIGS. 5A and 5C, overlaps three adjacent cell sites (5020, 5030, 5040) and includes three antennas (5025, 5035, 5045) from the overlapped cell sites.

For reception links, DSP server 5010 combines the three receiving paths from the antennas (5025, 5035, 5045) located in different locations (e.g., adjacent cell sites or sectors). This topology potentially provides better RF signal detection. For transmission links, DSP server 5010 distributes the transmit bit stream or RF signal. Because DSP server 5010 of the present invention performs a portion of the wireless access functions, the cell site equipment may be greatly reduced.

As can be seen from FIGS. 1B, 1C, 2B, and 2C, the present invention reduces the cost of network ownership, increases the capability of handling massive calling traffic, and reduces the quantity of cell site equipment.

The foregoing description of preferred embodiments of the present invention has been presented for purposes of illustration and description. It is not intended to be exhaustive or to limit the invention to the precise form disclosed, and modifications and variations are possible in light of the above teachings or may be acquired from practice of the invention. For example, the present invention is not limited to connections via an ATM network, and any high-speed network can alternatively be used. The scope of the invention is defined by the claims and their equivalents.

What is claimed is:

1. A method of communicating via a wireless access architecture comprising a plurality of cell sites coupled to main switching point means and a digital broadband backhaul connected between the plurality of cell sites and the main switching point means, the method comprising the steps of:
   executing first operations at the cell sites on communication signals communicated with cellular users, the first operations comprising the steps of
      transmitting communication signals to and receiving communication signals from the cellular users,
      amplifying the communication signals,
      converting the communication signals between digital and analog signals, and
      communicating with the main switching point means through the digital broadband backhaul using the communication signals; and
   executing second operations on the communication signals from the cell sites at the main switching point means, the second operations comprising the steps of
      modulating or demodulating the communication signals, and
      bit steam processing the communication signals.

2. A method of communicating via a wireless access architecture comprising a plurality of cell sites coupled to main switching point means and an analog fiber backhaul connected between the plurality of cell sites and the main switching point means, the method comprising the steps of:
   executing first operations at the cell sites on communication signals communicated with cellular users, the first operations comprising the steps of
      transmitting communication signals to and receiving communication signals from the cellular users,
      amplifying the communication signals, and
      communicating with the main switching point means through the analog fiber backhaul using the communication signals; and
   executing second operations on the communication signals from the cell sites at the main switching point means, the second operations comprising the steps of
      converting the communication signals between digital and analog signals,
      modulating or demodulating the communication signals, and
      bit steam processing the communication signals.

3. A wireless access architecture, comprising:
   a plurality of cell sites for servicing cellular users, each of the plurality of cell sites comprising
      communication means for exchanging communication signals with the cellular users;
   main switching point means, connected to the plurality of cell sites, for controlling communication with the cellular users and the communication means, the main switching point means comprising
      means for processing the communication signals from the cell sites, the processing means including means for modulating and demodulating the communication signals, and means for bit stream processing the communication signals; and
   backhaul means connected between the plurality of cell sites and the main switching point means.

4. A method of communicating via a wireless access architecture comprising a plurality of cell sites coupled to main switching point means and a digital broadband backhaul connected between the plurality of cell sites and the main switching point means, the method comprising the steps of:
   executing first operations at the cell sites on communication signals communicated with cellular users, the first operations comprising the steps of
      transmitting communication signals to and receiving communication signals from the cellular users,
      amplifying the communication signals, and
      communicating with the main switching point means through the digital broadband backhaul using the communication signals; and
   executing second operations on the communication signals from the cell sites at the main switching point means, the second operations comprising the steps of
      modulating or demodulating the communication signals, and
      bit steam processing the communication signals.

5. A method of communicating via a wireless access architecture comprising a plurality of cell sites coupled to main switching point means and an analog fiber backhaul connected between the plurality of cell sites and the main switching point means, the method comprising the steps of:
   executing first operations at the cell sites on communication signals communicated with cellular users, the first operations comprising the steps of
      transmitting communication signals to and receiving communication signals from the cellular users,
      amplifying the communication signals, and
      communicating with the main switching point means through the analog fiber backhaul using the communication signals; and
   executing second operations on the communication signals from the cell sites at the main switching point means, the second operations comprising the steps of
      modulating or demodulating the communication signals, and bit steam processing the communication signals.

6. A wireless access architecture, comprising:
a plurality of cell sites for servicing cellular users, each of the plurality of cell sites comprising
communication means for exchanging communication signals with the cellular
IF means, connected to the communication means, for converting the communication signals between digital and analog signals;
main switching point means, connected to the plurality of cell sites, for controlling communication with the cellular users and the cell sites, the main switching point means comprising
means for processing the communication signals from the cell sites, the processing means including means for modulating and demodulating the communication signals, and means for bit stream processing the communication signals; and
backhaul means connected between the plurality of cell sites and the main switching point means.

7. The wireless access architecture of claim 6, wherein the communication means comprises
at least one antenna for transmitting and receiving the communication signals, and
RF means, connected to the at least one antenna, for amplifying the communication signals.

8. The wireless access architecture of claim 6, wherein the main switching point means is a base station controller.

9. The wireless access architecture of claim 6, wherein the main switching point means is a mobile switching center.

10. The wireless access architecture of claim 6, wherein the main switching point means is a centralized DSP server.

11. The wireless access architecture of claim 6, wherein the backhaul means comprises a digital broadband backhaul.

12. The wireless access architecture of claim 11, wherein the digital broadband backhaul comprises ATM adaption layer protocol means and ATM means.

13. A wireless access architecture, comprising:
a plurality of cell sites for servicing cellular users, each of the plurality of cell sites comprising
communication means for exchanging communication signals with the cellular users;
main switching point means, connected to the plurality of cell sites, for controlling communication with the cellular users and the communication means, the main switching point means comprising
IF means for converting the communication signals from the cell sites between digital and analog signals, and
means for processing the communication signals, the processing means including means for modulating and demodulating the communication signals, and means for bit stream processing the communication signals; and
backhaul means connected between the plurality of cell sites and the main switching point means.

14. The wireless access architecture of claim 13, wherein the communication means comprises
at least one antenna for transmitting and receiving the communication signals, and
RF means, connected to the at least one antenna, for amplifying the communication signals.

15. The wireless access architecture of claim 13, wherein the main switching point means is a base station controller.

16. The wireless access architecture of claim 13, wherein the main switching point means is a mobile switching center.

17. The wireless access architecture of claim 13, wherein the main switching point means is a centralized DSP server.

18. The wireless access architecture of claim 13, wherein the backhaul means comprises an analog fiber backhaul.

19. The wireless access architecture of claim 18, wherein the analog fiber backhaul comprises wavelength division multiplexing (WDM) means.

* * * * *

UNITED STATES PATENT AND TRADEMARK OFFICE
CERTIFICATE OF CORRECTION

PATENT NO. : 5,896,568
DATED : April 20, 1999
INVENTOR(S) : STONE TSENG ET AL.

It is certified that error appears in the above-indentified patent and that said Letters Patent is hereby corrected as shown below:

Claim 6, col. 7, line 6, after "cellular" insert --users, and--.

Signed and Sealed this

Thirty-first Day of August, 1999

*Attest:*

Q. TODD DICKINSON

*Attesting Officer*     *Acting Commissioner of Patents and Trademarks*